Sept. 1, 1931. B. STOCKFLETH 1,821,122
BEARING SLEEVE AND METHOD OF MAKING SAME
Filed July 17, 1929
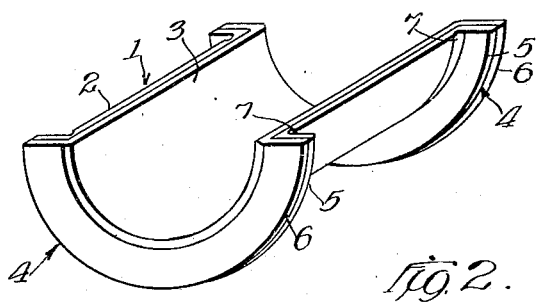
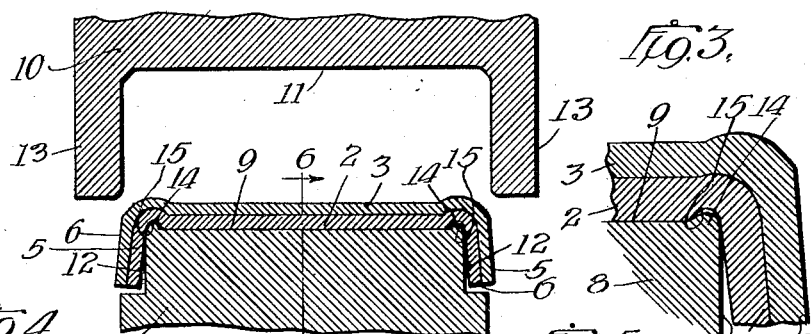
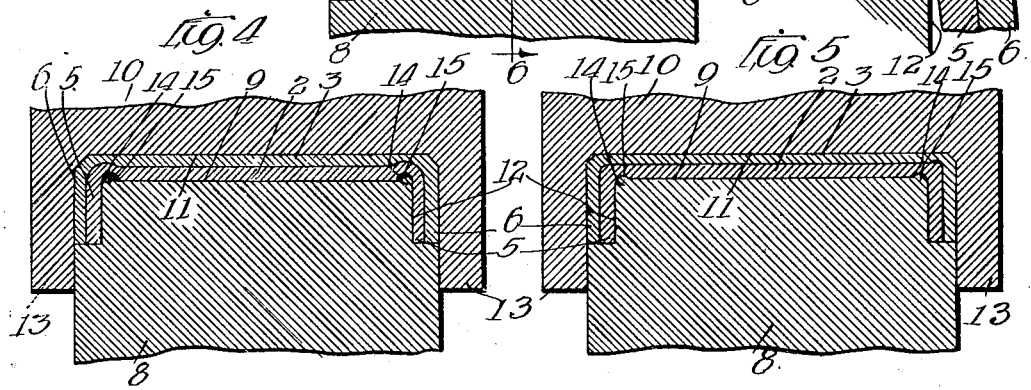
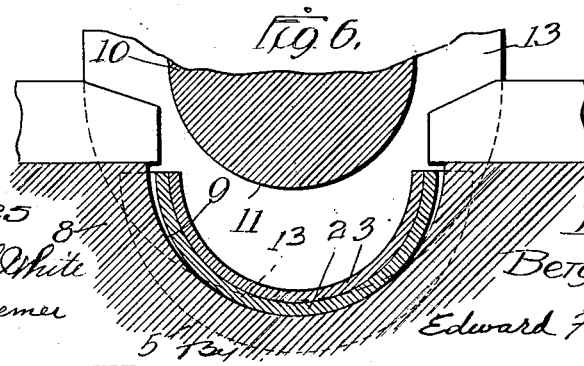
Witnesses
Harry R. L. White
Robert Cremer
Inventor
Berger Stockfleth
Edward Fay Wilson
Atty.

Patented Sept. 1, 1931

1,821,122

UNITED STATES PATENT OFFICE

BERGER STOCKFLETH, OF NILES, MICHIGAN, ASSIGNOR TO HYDRAULIC PRESSED BEARING COMPANY, OF WILMINGTON, DELAWARE, A CORPORATION OF DELAWARE

BEARING SLEEVE AND METHOD OF MAKING SAME

Application filed July 17, 1929. Serial No. 378,927.

This invention relates to improvements in the production of bearing sleeves which have harder metal backs and softer bearing metal linings and has special reference to improved methods and means of producing same by the pressure method in suitable dies.

In my co-pending application, filed February 4, 1929, Serial No. 337,433, there is disclosed a method of forming clearance grooves at the junctures of end flanges with the bodies of such bearing sleeves. The method disclosed in said co-pending application includes circumferential ridges on the die member which forms the back of the sleeve. This present invention relates particularly to a means of preventing undue strains being applied to these ridges and the end portions of the die in the bearing forming process.

The invention consists in preforming the backs with circumferential grooves at their end at the juncture of the end flanges with the bodies thereof, which are large enough to permit the shell to seat down in the die, free of the end ridges thereof. Then, when the die closes to form and finish the bearing sleeve, the main pressure is taken by the main body of the die and not by the end ridges.

The invention will be more readily understood by reference to the accompanying drawings forming part of this specification and in which:—

Fig. 1 is a perspective view of a finished half cylindrical bearing sleeve made in accordance with this invention;

Fig. 2 is a fragmentary vertical longitudinal section of a pair of die members used in the making of these bearing sleeves and shown in position to begin to operate;

Fig. 3 is an enlarged fragmentary sectional view similar to Fig. 2, for more clearly illustrating the invention;

Figs. 4 and 5 are sectional views similar to Fig. 2, showing further steps in the operation of the dies; and Fig. 6 is a transverse section on the line 6—6 of Fig. 2.

The bearing sleeve 1 illustrated in Fig. 1 consists of a harder metal back 2 and a bearing metal lining 3. The sleeve 1 has end flanges 4 which consist of flanges 5 on the back 2 covered with the bearing metal 6. At the juncture of the flanges 4 with the cylindrical part of the sleeve there are provided clearance grooves 7 to permit the sleeves to be seated freely and firmly in the bearing housings in which they are used and as particularly pointed out in said co-pending application supra.

The backs 2 are preferably formed up out of sheet metal, and it is a practical impossibility to form the re-entrant angles between the flanges and the cylindrical portions of the sleeves exactly square, hence the clearance grooves 7.

The sleeves are preferably made by what is known as the pressure method, viz., by means of dies which are closed upon rough formed blanks and are squeezed in the dies to the desired dimensions. Heretofore, the blanks for the backs have been roughly formed to size, the flanges 5 being formed projecting outwardly and the angle between the flanges and body slightly rounded as such angles would naturally be formed. The bearing metal lining has then been applied and the sleeve then placed in the dies for the final forming operation.

The dies used consist of a lower member 8 having a half cylindrical opening 9 to form the outer surface of the sleeve and a plunger or top member 10 formed into semi-cylindrical form at its lower end 11 to form the inner surface of the bearing sleeve. The lower die member 8 has end spaces 12, and the upper die member 10 has end flanges 13 for forming the end flanges 4. At the ends of the cylindrical part 9 of the lower member, it is provided with circumferential ridges 14 for forming the clearance grooves 7. Heretofore, when the rough blanks were laid in the lower die member, they rested at their ends on the ridges 14, and the first action of the upper die 10 as it descended was to press the bearing shell down upon and around these ridges, but it was found that the tremendous pressures used tended to fracture and destroy the lower die member, breaking off the end portions on account of the heavy pressures applied to the ridges 14. The present invention relates particularly to means for avoiding this destruction of the dies.

In the present method, the rough blanks for the backs are formed with relatively large circumferential grooves 15 at the time the flanges 5 are formed. These grooves 15 are larger than the groove-forming ridges 14, so that, when the rough sleeves are placed in the dies, the cylindrical part of the backs can rest freely down on the cylindrical surface 9 of the lower die, as shown in Fig. 2, and the ridges 14 are not subject to any initial pressure in the forming of the sleeves.

As shown in Fig. 4, when the top die member has descended far enough to form the flanges 4 into position, the ridges 14 are still free of pressure. These ridges only act as the final finishing pressure is applied and the material of the sleeve is closed in upon them, as shown in Fig. 5. In this manner, the ridges 14 perform their function of shaping the clearance grooves, but they are not subject to fracturing pressures.

As many modifications of the invention will readily suggest themselves to one skilled in the art, the invention is not limited to the specific details of construction and sequence of steps herein shown and described.

I claim:

1. The herein described method of making flanged bearing sleeves which consists in preforming backs for the sleeves with end flanges and with circumferential grooves at the juncture of the flanges and body, and pressing such preformed backs into a die formed to receive same, the die having end ridges of less height than the depth of the grooves, so that the back can rest down upon the main body of the die between the end ridges and forming the back to fit around said end ridges by pressure applied thereto.

2. In the process of making flanged bearing sleeves by the pressure method, the step of providing a sleeve back with deep clearance grooves in its ends, and later reducing the size of said grooves in suitable dies.

3. A blank flanged back for a bearing sleeve, the back having circumferential grooves at the juncture of the flanges and body of greater cross-section than desired in the finished shell.

In testimony whereof, I have hereunto set my hand this 8th day of May, 1929.

BERGER STOCKFLETH.